United States Patent [19]

Goldie

[11] 4,082,692

[45] Apr. 4, 1978

[54] POLYMERIZATION CATALYST

[75] Inventor: Brian Peter Forsyth Goldie, Cheam, England

[73] Assignee: The British Petroleum Company Limited, London, England

[21] Appl. No.: 712,949

[22] Filed: Aug. 9, 1976

[30] Foreign Application Priority Data

Aug. 21, 1975 United Kingdom .............. 34759/75

[51] Int. Cl.$^2$ ........................... C08F 4/02; C08F 4/64
[52] U.S. Cl. ............................ 252/429 B; 252/429 C; 252/430; 526/142
[58] Field of Search ................ 252/429 B, 430, 431 R

[56] References Cited

U.S. PATENT DOCUMENTS

| | | | |
|---|---|---|---|
| 3,150,122 | 9/1964 | Andersen et al. | 260/650 R |
| 3,163,611 | 12/1964 | Andersen et al. | 252/429 B |
| 3,166,542 | 1/1965 | Orzechowski et al. | 252/429 A X |
| 3,226,338 | 12/1965 | Riley et al. | 252/440 |
| 3,267,162 | 8/1966 | Bohl | 252/441 X |
| 3,483,136 | 12/1969 | van der Plas et al. | 252/441 |
| 3,649,709 | 3/1972 | Medema et al. | 252/429 B X |
| 3,993,588 | 11/1976 | Thukral | 252/441 X |

*Primary Examiner*—Patrick P. Garvin
*Attorney, Agent, or Firm*—Brooks, Haidt, Haffner & Delahunty

[57] ABSTRACT

Process for the production of a supported Ziegler catalyst comprising adding a halogen containing titanium compound to a fluidized bed of a magnesium-containing Ziegler support material and treating the product with an alcohol or phenol. Preferred titanium compound is titanium tetrachloride and preferred support material is magnesium oxide of the product of heating magnesium chloride with silica. The catalyst is activated using conventional Ziegler activators e.g. trialkyl aluminium.

12 Claims, No Drawings

POLYMERIZATION CATALYST

The present invention relates to a process for the production of a supported Ziegler catalyst and to the use of the catalyst in the polymerisation of olefins.

It has long been known that olefins such as ethylene can be polymerised by contacting them under polymerisation conditions with a catalyst comprising a transition metal compound, e.g. titanium tetrachloride and a co-catalyst or activator, e.g. an organometallic compound such as triethyl aluminium. Catalysts of this type are generally referred to as Ziegler catalysts and will be referred to as such throughout this specification. The catalyst and co-catalyst together will be referred to as activated Ziegler catalysts. It is also known to deposit such catalysts on support materials such as silicon carbide, calcium phosphate, magnesium carbonate or sodium carbonate. More recently it has been found that catalysts of the supported Ziegler type can be made by reacting a compound of a transition metal with a solid support comprising a hydroxychloride of a bivalent metal. (See, for example, UK patent specification No. 1,024,336). It is further known to polymerise olefins using an activated supported Ziegler catalyst comprising a hydride or organometallic compound of a metal of Group I, II or III of the Periodic system as activator and, as the supported Ziegler catalyst, the product obtained by contacting a titanium tetrahalide with a support comprising an anhydrous magnesium or zinc halide in an active form in which the highest intensity diffraction line in the X-ray powder spectrum is replaced by a halo of lower intensity and/or having a surface area greater than 3 square meters per gramme.

It is an object of the present invention to provide an improved supported Ziegler catalyst.

Accordingly the present invention provides a process for the production of a supported Ziegler catalyst comprising adding a compound having the general formula $M(OR)_nX_{4-n}$ wherein M is titanium, O is oxygen, R is a hydrocarbon radical, X is halogen and $O \leq n < 4$, to a fluidised bed of a magnesium-containing Ziegler support material and treating the product with an alcohol or a phenol. Preferably $n$ is 0, 1 or 2.

The compound having the general formula $M(OR)_nX_{4-n}$ hereinafter referred to as the titanium compound. The R radical (present when n > O) is a hydrocarbon radical, for example an alkyl or aryl radical. R is preferably an alkyl radical containing from 1 to 6 carbon atoms, for example, the isopropyl radical. X is a halogen atom, for example chlorine or bromine, chlorine being preferred. Examples of titanium compounds that can be used in the present invention are titanium tetrachloride, titanium dichloro diisopropylate and, [TiCl$_2$(OiPr)$_2$]. Titanium tetrachloride is preferred.

The magnesium-containing Ziegler support material used in the present invention is suitably any material comprising chemically combined magnesium which is capable of being used as a Ziegler support. Examples of such materials are magnesium oxide, magnesium hydroxide, magnesium hydroxychloride and magnesium chloride. Preferred support materials are magnesium oxide and the material obtained by heating together at a temperature in the range 150° –1,000° C, preferably 300° to 800° C, an inorganic oxide support material selected from silica or a silica composite having chemisorbed surface hydroxyl groups and a magnesium compound selected from magnesium halides and magnesium alkoxides, for example magnesium chloride. A material of this type is disclosed in our copending U.S. application Ser. No. 529391 filed Dec. 4, 1974 now U.S. Pat. No. 3,993,588 and in our Belgian Pat. No. 823,355.

The quantity of titanium compound used is suitably at least sufficient to give a titanium concentration in the final catalyst in the range 0.5 to 30%, preferably 1.0 to 10%. Any free titanium compound, i.e. compound that does not react with or is not strongly absorbed on the support material, should preferably be removed from the support material, for example by washing with a solvent for the titanium compound. The quantity employed, for a given titanium compound and support material is preferably not greater than the quantity that is absorbed by the support. The quantity that is absorbed by a given support is dependent to some extent on the treatment technique employed, but a rough measure of the amount of titanium that is absorbed by a given support can generally be determined as follows:

The magnesium-containing support material is slurried with 5 times its weight of a 7.5% w/w solution of the titanium compound in an inert solvent, stirred at room temperature for 15 minutes at a speed sufficient to maintain the support in suspension. The slurry is then filtered and washed with two aliquots of the inert solvent, each aliquot being about 5 times the weight of the original sample of support. The quantity of titanium in the filtrate plus washings is determined by a standard analytical technique and hence the weight of absorbed titanium can be calculated by difference. If the support material is found to be so porous that a slurry is not formed in the above technique, further inert solvent is added until a slurry is formed. For most titanium and vanadium compounds according to the invention, cyclohexane is found to be a suitable inert solvent.

Fluidisation of the support material may be carried out using any of the known techniques, for example using gases or vibrators. The titanium compound can be added to the fluidised support material in any desired manner, for example the compound can be added as the neat solid, liquid or vapour; or as a solution in a hydrocarbon solvent; or as an atomised spray or a vapour carried in an inert carrier gas, for example dry nitrogen or argon. In a preferred embodiment according to the present invention titanium tetrachloride vapour is carried into the support material using nitrogen or argon as a carrier gas and as the means of fluidising the support material. During the addition of the titanium compound the fluidised bed of support material can be heated if desired, for example to a temperature up to 100° C.

After the desired amount of titanium compound has been added it is desirable to check whether any free titanium compound is present, for example by washing a sample of the support material with hexane and analysing the hexane washings for titanium. If free titanium compound is found to be present it is preferred to remove this, for example by washing with an inert solvent (e.g. a hydrocarbon such as hexane) or by heating and gas-fluidising the titanium treated support material until the washings or the exit gas are titanium free.

The alcohol employed in the present invention is suitably any primary, secondary or tertiary alcohol. Preferred alcohols are primary aliphatic alcohols containing 1 to 8 carbon atoms, the use of methanol, ethanol and isopropanol being particularly preferred. Phenols, for example phenol itself, can also be used to replace part or all of the alcohol.

The quantity of alcohol or phenol employed in the present invention is suitably 0.5 to 5.0 moles, preferably 1.0 to 3.0 moles per gram atom of titanium present in the titanium treated support material.

The titanium treated support material can be treated with the alcohol or phenol using any desired technique, for example by adding the neat alcohol or phenol to the material, by adding a mixture of the alcohol or phenol and an inert solvent, e.g. petroleum ether, hexane, cyclohexane or carbon tetrachloride to the material or by passing alcohol or phenol vapour into a fluidised bed of the material. Where more than one alcohol or phenol is employed they may be employed as a mixture or added successively to the titanium treated support material. The alcohol or phenol and the titanium treated support material can be heated together at a temperature up to about 100° C if desired.

Any excess alcohol or phenol must be removed from the produced catalyst before the latter is employed in Ziegler polymerisation. Excess alcohol or phenol can conveniently be removed by, for example, vacuum drying or solvent washing.

The process of the present invention is preferably carried out using dry starting materials and in the absence of any sources of moisture.

The present invention further provides a process for polymerising 1-olefins comprising contacting the monomer under polymerisation conditions with the supported Ziegler catalyst of the present invention in the presence of a Ziegler catalyst activator.

The polymerisation process according to the present invention can be applied to the polymerisation of 1-olefins e.g. ethylene or propylene or mixtures of olefins, e.g. ethylene with other 1-olefins, for example, propylene, 1-butene, 1-pentene, 1-hexene, 4-methyl pentene-1, 1,3-butadiene or isoprene. The process is particularly suitable for the polymerisation of ethylene or copolymerisation of ethylene with up to 40 weight % (based on total monomer) of comonomers, i.e. one or more other 1-olefins.

As with conventional supported Ziegler catalysts, the catalyst of the present invention is activated with a Ziegler catalyst activator. Ziegler catalyst activators and the method by which they are used to activate Ziegler catalysts are well known. Examples of Ziegler catalyst activators are organic derivatives of hydrides of metals of Groups I, II, III and IV of the Periodic Table. Particularly preferred are the trialkyl aluminiums or an alkyl aluminium halide, e.g. triethyl or tributyl aluminium.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium use can be made of an inert hydrocarbon which is liquid under the polymerisation conditions, or of the monomer or monomers themselves maintained in the liquid state under their saturation pressure. The polymerisation can, if desired, be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3–30 carbon atoms per molecule. Suitable diluents include, for example, isopentane, isobutane and cyclohexane. Isobutane is preferred.

The polymerisation can be carried out under continuous or batch conditions.

Methods of recovering the product polyolefin are well known in the art.

The polymerisation catalyst of the present invention can be used to make high density ethylene polymers and copolymers at high productivity having properties which render them suitable for injection moulding. The polymer obtained also has an improved particle size distribution with typically very low fines content.

The invention is further illustrated by the following Example:

In the Examples the melt index ($MI_{2.16}$) and high load melt index ($MI_{21.6}$) were determined according to ASTM method 1238 using 2.16 Kg and 21.6 Kg loads respectively; the units are grammes per 10 minutes. "MIR" is the melt index ratio $MI_{21.6}/MI_{2.16}$.

EXAMPLE 13.9g of anhydrous $MgCl_2$ (previously dried at 150° C under vacuum) was fluidised at 200° C for 3 hours in a stream of dry nitrogen. 26.2g of Davison grade 951 silica (previously dried at 150° C under vacuum) was then charged to the above fluidised bed and the temperature raised to 500° C and held there for 7 hours in a stream of dry nitrogen. HCl was evolved during the formation of the catalyst support.

The support was cooled to room temperature while still fluidised by $N_2$ and 4.6 ml $TiCl_4$ (5% by weight of Ti based on the weight of the support) was carried into the fluidised bed by the dry $N_2$ stream. The $TiCl_4$ was allowed to react and then 5 ml isopropanol (approximately 1.6 moles alcohol per gram atom of Ti) was passed into the bed by the fluidising $N_2$ stream. During formation of the supported catalyst, HCl was evolved.

The catalyst (0.164g) was then charged to a ½ gallon autoclave at 30°–40° C. Aluminium triethyl (0.401g) was then added followed by isobutane (1,000 ml). The autoclave was heated until the pressure of isobutane reached 100 psig (58° C). Hydrogen (100 psig) was added and the autoclave heated to 80° C and ethylene admitted to raise and maintain a pressure of 600 psig. The reaction was controlled at 80° C for 60 minutes and the yield of polyethylene was 335g corresponding to a productivity of 2045g polymer/g catalyst/hour.

The polymer was treated with antioxidant and had MI 0.6 and MIR 30.

I claim:

1. In a process for the production of a supported Ziegler catalyst comprising adding a compound having the general formula $M(OR)_nX_{4-n}$, wherein M is titanium, X is halogen, R is a hydrocarbon radical and $0 \leq n < 4$, to a fluidized bed of a magnesium-containing Ziegler support material, the improvement of adding from 0.5 to 5.0 moles of alcohol or phenol per gram atom of titanium to the titanium treated support material at a temperature up to about 100° C., and removing excess alcohol or phenol.

2. A process as claimed in claim 1 wherein $n$ is 0, 1 or 2.

3. A process as claimed in claim 1 wherein R is an alkyl radical containing from 1 to 6 carbon atoms.

4. A process as claimed in claim 1 wherein the said compound is titanium dichloro diisopropylate.

5. A process as claimed in claim 1 wherein the said compound is titanium tetrachloride.

6. A process as claimed in claim 1 wherein the support material is magnesium oxide.

7. A process as claimed in claim 1 wherein the support material is the product of heating together magnesium chloride and silica at a temperature in the range 300° to 800° C.

8. A process as claimed in claim 1 wherein the quantity of titanium compound employed is at least sufficient to give a titanium concentration in the final catalyst in the range 1.0 to 10% based on the total weight of catalyst.

9. A process as claimed in claim 1 wherein the fluidisation is achieved using an inert gas and the titanium compound is carried into the gas in the form of an atomised spray or vapour.

10. A process as claimed in claim 1 wherein the product of treating the support material with the titanium compound is washed with an inert solvent prior to treating with the alcohol or phenol.

11. A process as claimed in claim 1 wherein the alcohol is methanol, ethanol or isopropanol.

12. A process as claimed in claim 1 wherein the quantity of alcohol or phenol employed is 1.0 to 3.0 moles per gram atom of titanium present in the treated support material.

* * * * *

UNITED STATES PATENT AND TRADEMARK OFFICE
CERTIFICATE OF CORRECTION

PATENT NO. : 4,082,692
DATED : April 4, 1978
INVENTOR(S) : BRIAN PETER FORSYTH GOLDIE It is certified that error appears in the above–identified patent and that said Letters Patent are hereby corrected as shown below:

Col. 2, lines 34 and 35, delete "and vanadium".

Signed and Sealed this

Third Day of October 1978

[SEAL]

Attest:

RUTH C. MASON
Attesting Officer

DONALD W. BANNER
Commissioner of Patents and Trademarks